US 8,535,533 B2

(12) United States Patent
Allard

(10) Patent No.: US 8,535,533 B2
(45) Date of Patent: Sep. 17, 2013

(54) BIORETENTION SYSTEM WITH HIGH INTERNAL HIGH FLOW BYPASS

(75) Inventor: Douglas Allard, Occidental, CA (US)

(73) Assignee: KriStar Enterprises, Inc., Santa Rosa, CA (US)

(*) Notice: Subject to any disclaimer, the term of this patent is extended or adjusted under 35 U.S.C. 154(b) by 251 days.

(21) Appl. No.: 12/977,015

(22) Filed: Dec. 22, 2010

(65) Prior Publication Data
US 2011/0147303 A1    Jun. 23, 2011

Related U.S. Application Data

(60) Provisional application No. 61/289,376, filed on Dec. 22, 2009.

(51) Int. Cl.
*C02F 3/32*    (2006.01)
*E03F 5/14*    (2006.01)
*E03F 5/04*    (2006.01)
*C02F 103/00*    (2006.01)
*E03F 5/16*    (2006.01)

(52) U.S. Cl.
CPC .......... *C02F 3/327* (2013.01); *C02F 2103/001* (2013.01); *C02F 2303/24* (2013.01); *E03F 5/0404* (2013.01); *E03F 5/14* (2013.01); *E03F 5/16* (2013.01)
USPC ........ 210/602; 210/617; 210/747.3; 210/151; 210/170.03; 210/254

(58) Field of Classification Search
USPC ................ 210/602, 617, 747.2, 747.3, 150, 210/151, 170.03, 254
See application file for complete search history.

(56) References Cited

U.S. PATENT DOCUMENTS

| 4,537,687 | A |  | 8/1985 | Piper |
|---|---|---|---|---|
| 5,322,629 | A |  | 6/1994 | Stewart |
| 5,437,786 | A |  | 8/1995 | Horsley |
| 5,549,817 | A |  | 8/1996 | Horsley |
| 5,624,576 | A |  | 4/1997 | Lenhart et al. |
| 5,702,593 | A |  | 12/1997 | Horsley |
| 5,707,527 | A |  | 1/1998 | Knutson et al. |
| 5,728,305 | A |  | 3/1998 | Hawkinson |
| 5,759,415 | A |  | 6/1998 | Adams |
| 5,788,848 | A |  | 8/1998 | Blanche et al. |
| 5,985,157 | A |  | 11/1999 | Leckner et al. |
| 6,027,639 | A |  | 2/2000 | Lenhart, Jr. et al. |
| 6,132,603 | A | * | 10/2000 | Mokrzycki et al. ...... 210/170.03 |
| 6,277,274 | B1 |  | 8/2001 | Coffman |

(Continued)

FOREIGN PATENT DOCUMENTS

WO    WO 2010/118110 A9    10/2010

OTHER PUBLICATIONS

PCT, Written Opinion of the International Search Authority for International Application No. PCT/US2010/030206, Date of Mailing: Jun. 10, 2010.

(Continued)

*Primary Examiner* — Christopher Upton

(57) ABSTRACT

The invention provides a bioretention system comprising one or more chambers and a high flow bypass system with top and bottom weirs for water filtration and storm water flow management. The invention also provides methods that are useful for managing storm water flow and inhibiting the flow of pollutants, debris, and other contaminants into drainage systems.

37 Claims, 13 Drawing Sheets

(56) References Cited

U.S. PATENT DOCUMENTS

| | | | |
|---|---|---|---|
| 6,350,374 | B1 | 2/2002 | Stever et al. |
| 6,406,218 | B1 | 6/2002 | Olson |
| 6,511,595 | B2 | 1/2003 | Crompton et al. |
| 6,569,321 | B2 | 5/2003 | Coffman |
| 6,641,720 | B1 | 11/2003 | Crompton et al. |
| 6,649,048 | B2 | 11/2003 | de Ridder et al. |
| 6,783,683 | B2 * | 8/2004 | Collings ............... 210/170.03 |
| 6,905,599 | B2 | 6/2005 | Allard |
| 6,991,114 | B2 | 1/2006 | Allen, II et al. |
| 6,991,402 | B2 | 1/2006 | Burkhart |
| 6,998,038 | B2 | 2/2006 | Howard |
| 7,022,243 | B2 * | 4/2006 | Bryant ..................... 210/747.3 |
| 7,160,058 | B2 | 1/2007 | Burkhart |
| 7,186,058 | B2 | 3/2007 | Schluter et al. |
| 7,186,333 | B2 | 3/2007 | Kluge |
| 7,296,692 | B2 | 11/2007 | Allen, II et al. |
| 7,297,266 | B2 | 11/2007 | Cobb et al. |
| 7,344,335 | B2 | 3/2008 | Burkhart |
| 7,425,261 | B2 | 9/2008 | Siviter et al. |
| 7,425,262 | B1 | 9/2008 | Kent |
| 7,470,362 | B2 | 12/2008 | Kent |
| 7,625,485 | B2 | 12/2009 | Siviter et al. |
| 7,638,065 | B2 | 12/2009 | Stever |
| 7,674,378 | B2 | 3/2010 | Kent |
| 7,776,217 | B2 * | 8/2010 | Lucas .......................... 210/602 |
| 7,833,412 | B2 | 11/2010 | Holtz |
| 7,985,335 | B2 * | 7/2011 | Allard ..................... 210/170.03 |
| 8,110,105 | B2 | 2/2012 | Allen, II |
| 2004/0226869 | A1 | 11/2004 | McClure et al. |
| 2007/0068878 | A1 | 3/2007 | Stever et al. |
| 2008/0121594 | A1 | 5/2008 | Dierkes |
| 2008/0217227 | A1 * | 9/2008 | Pank ..................... 210/170.03 |
| 2008/0217257 | A1 * | 9/2008 | Pank ............................ 210/747 |
| 2009/0050583 | A1 | 2/2009 | Arnott et al. |
| 2009/0250405 | A1 | 10/2009 | Allard |
| 2011/0186492 | A1 * | 8/2011 | Holtz ..................... 210/170.03 |
| 2012/0031854 | A1 | 2/2012 | Allard |
| 2012/0152827 | A1 * | 6/2012 | Allard ........................... 210/602 |

OTHER PUBLICATIONS

International Search Report for International Application No. PCT/US 10/30206, with date of mailing Jun. 10, 2010.

Notification Concerning Transmittal of International Preliminary Report on Patentability (Chapter I of the Patent Cooperation Treaty) for International Application Non. PCT/US2010/030206, with date of mailing Oct. 20, 2011.

Contech Construction Products Inc., UrbanGreen™ BioFilter Design, Operation and Performance, 2009.

Contech Construction Products Inc., UrbanGreen™ BioFilter Specification, Apr. 2009.

Contech Construction Products Inc., UrbanGreen Biofilter UGBF0406 Standard Detail, with date Dec. 2, 2010.

Contech Construction Products Inc., UrbanGreen BioFilter UGBF0406-NC Standard Detail, with date Dec. 2, 2010.

Contech Construction Products Inc., UrbanGreen Biofilter UGBF0608 Standard Detail, with date Dec. 2, 2010.

Contech Construction Products Inc., UrbanGreen BioFilter UGBF0608-NC Standard Detail, with date Dec. 2, 2010.

Contech Construction Products Inc., UrbanGreen BioFilter UGBF061212 Standard Detail, with date Dec. 2, 2010.

Contech Construction Products Inc., UrbanGreen BioFilter UGBF0612-NC Standard Detail, with date Dec. 2, 2010.

Contech Construction Products Inc., UrbanGreen BioFilter UGBF0816 Standard Detail, with date Dec. 2, 2010.

Contech Construction Products Inc., UrbanGreen BioFilter UGBF0816-NC Standard Detail, with date Dec. 2, 2010.

Third-Party Preissuance Submission Under 37 CFR 1.290 filed in the USPTO on Oct. 30, 2012 in connection with co-pending U.S. Appl. No. 13/214,230.

Third-Party Preissuance Submission Under 37 CFR 1.290 filed in the USPTO on Feb. 4, 2013 in connection with co-pending U.S. Appl. No. 13/214,230.

* cited by examiner

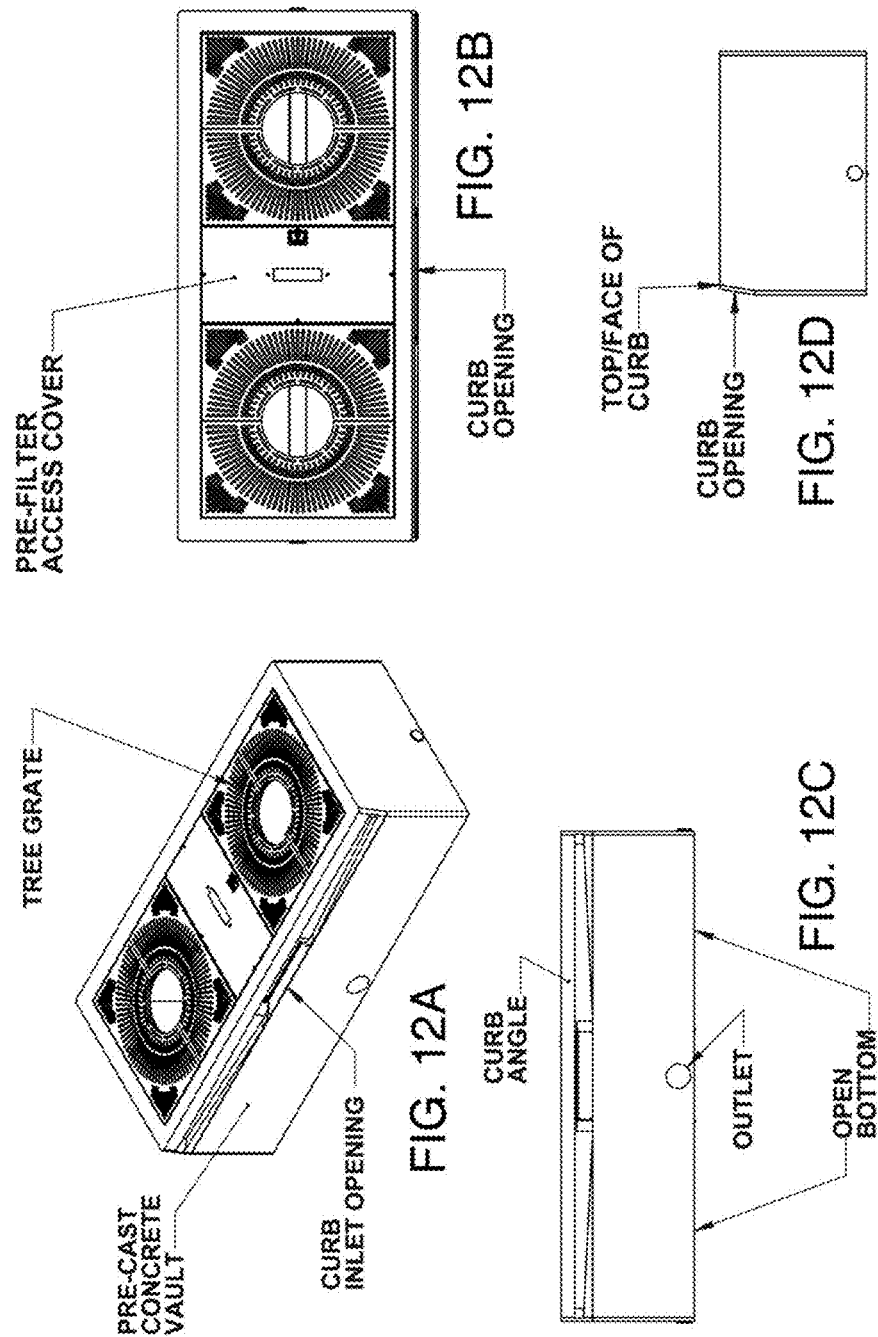

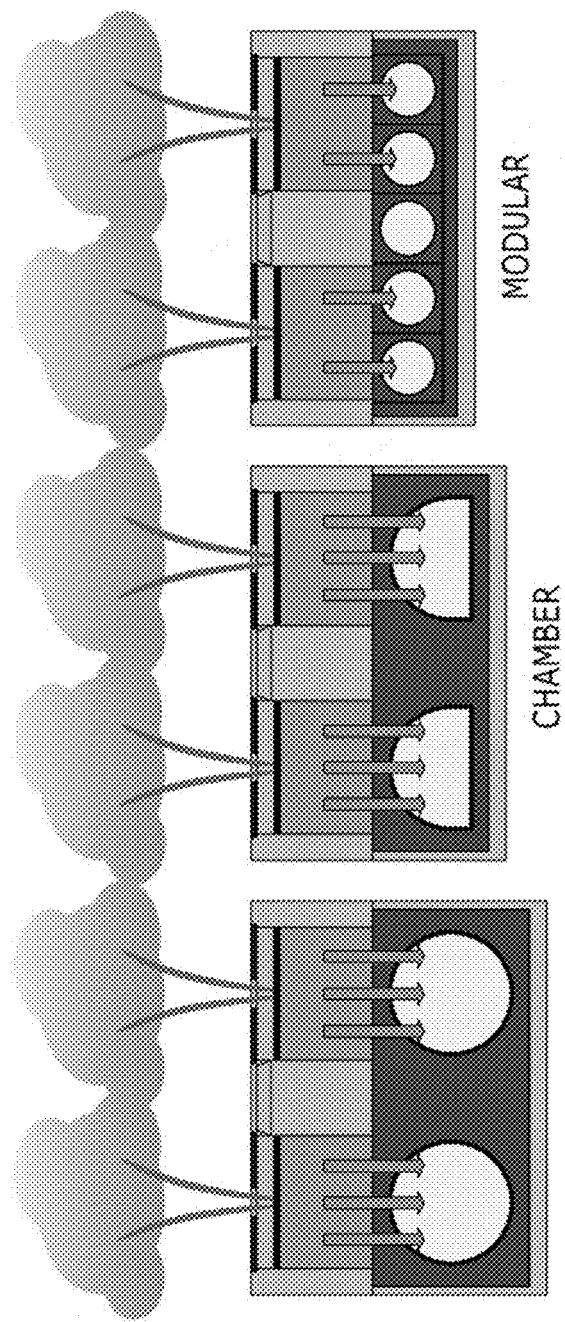

BIORETENTION SYSTEM WITH HIGH INTERNAL HIGH FLOW BYPASS

CROSS-REFERENCE TO RELATED APPLICATION

This application claims the benefit of U.S. Provisional Application No. 61/289,376, filed Dec. 22, 2009.

FIELD OF THE INVENTION

The present invention relates to storm water management systems that are useful for the control of storm water runoff and the removal of pollutants, debris, and other contaminants from storm water runoff; and more specifically, to bioretention systems that are useful for managing storm water flow and inhibiting the flow of pollutants, debris, and other contaminants into drainage systems.

BACKGROUND OF THE INVENTION

Many federal and state regulatory schemes require controlling storm water run-off and water quality, such as levels of pollutants on new developments of land. Before land development, an area will likely have included a variety of natural land features, such as sand dunes, grassy hills and wetlands. The natural land features absorb rainwater and infiltrate storm water runoff into the soil to replenish groundwater and streams. Following land development, however, the area might contain impervious surfaces such as buildings, streets, and parking lots that cover the ground and prevent rainfall infiltration. As a result, storm water runoff can accumulate pollutants such as oil and debris, which then flows into a sewer system or other receiving water bodies.

Bioretention systems for managing and filtering storm water runoff are a well known Low Impact Design ("LID") approaches to mitigate the impacts of impervious surfaces and manage the flow of storm water runoff on developed land. Bioretention systems utilize soils and both woody and herbaceous plants to remove pollutants, including ultra-fine and dissolved pollutants, from storm water runoff close to their source. The systems mimic the natural (i.e., pre-development) storm water flow from the land. One type of bioretention system includes a tree box filter, which is also referred to as a tree box planter.

In a conventional tree box filter, storm water runoff flows into an in-ground or above ground vault-shaped container with bioretention media, including mulch, and engineered soil. As the tree box filter infiltrates and temporarily stores runoff water, the bioretention media captures particulate matter, including ultra-fine and dissolved pollutants, and allows the treated storm water to percolate through the system. The storm water eventually exists through an outlet in the container into a drainage system or water retention/storage system.

One of the concerns that has emerged is the ability of bioretention systems, including conventional tree box filters, to process large quantities of fluid during peak flow periods without having backups that result in localized flooding of the surrounding areas. Most bioretention systems will have an upper limit for the amount of water that can be filtered at any time, as well as a maximum capacity for the amount of water that can be passed through the system in any event.

To address storm water flow during periods of peak flow and increase the upper limit for fluid flow, some bioretention systems employ an external high-flow bypass mechanism. The feature allows excess fluids to proceed through the drainage system without being filtered during periods of high fluid flow. This conventional high flow bypass is a separate structure, often a separate catch basin or similar device connected to the tree box filter by an external pipe or other mechanism and located downstream from the system. However, because the high flow bypass is an external structure—externally added to the tree box or other bioretention system components—its incorporation with tree box filters requires additional space (to accommodate the external bypass structure), as well as additional design, manufacturing, installation, and maintenance costs.

Another concern is the ability of the bioretention system to remove gross pollutants from incoming storm water prior to releasing it. Ideally, the bioretention system should pre-treat (e.g., using filtration systems) water flow from the developed land prior to releasing it. The entrance of gross pollutants, such as trash, debris, floatables, and coarse sediments, are known to "clog" the system and thus reduce the efficiency. It also increases the maintenance frequency of typical bioretention systems. Pre-treatment apparatus that can remove gross pollutants from the treated flows should be incorporated into the bioretention system in order to minimize land usage. The pre-treatment apparatus also should be accessible for intermittent cleaning, repair, and/or other maintenance.

In addition, bioretention systems typically are installed under large concrete or asphalt surfaces to treat storm water that has run over impervious surfaces in commercial, residential, and industrial areas such as median strips, parking lots, sidewalks, and swales. They must be capable of bearing highly variable weight loads. It is desirable for the systems to maximize water storage while occupying as small a "footprint" as possible to minimize land usage and site excavation costs.

Accordingly, what is desired is a bioretention system solving many or all of the foregoing problems, including a bioretention system that can effectively process increased amounts of storm water runoff during peak periods of high fluid flow and can efficiently utilize space within a developed land site. It is another objective of the invention to provide a flexible and economical design that simplifies the design of construction of storm water drainage systems. It is yet another objective of the invention to provide a bioretention system that has fewer and more manageable parts that are relatively easy to maintain and service. It is yet another objective of the invention to provide a bioretention system that has pre-filtration capabilities to remove gross pollutants from storm water runoff before it is released.

BRIEF SUMMARY OF THE INVENTION

The present invention is directed generally to a sustainable low impact design for storm water management. The system can be installed in various configurations to receive and treat storm water.

Generally, the system has a vault-like structure comprising a biofiltration chamber (first chamber) designed to incorporate bio filtration media, such as mulch, plants, soil, other organic matter, or a combination thereof, that capture particulate matter (e.g., ultra-fine and dissolved pollutants) from incoming storm water. The vault-like structure also comprises an internal high flow bypass structure including a top and bottom weir. The high flow bypass structure can be contained at least in part within system. It provides an alternate route for storm water during periods of high fluid flow. As described herein, at least part of the high flow bypass structure can be configured according to the assemblies described in greater detail herein.

In one embodiment, the present invention provides a bioretention assembly for use in an underground storm water management system comprising four sidewalls; a bio filtration chamber disposed within said sidewalls and dimensioned to contain bio filtration media; and a bypass structure disposed within said sidewalls and comprising a top weir (also known as overflow weir) and a bottom weir (also known as underflow weir), wherein the top and bottom weirs are dimensioned to at least partially obstruct fluid flow through the bioretention assembly.

The bioretention assembly can further comprise a substantially rectangular pre-filter chamber (second chamber) disposed within said sidewalls, wherein the pre-filter chamber is dimensioned to fit at a curb inlet opening. The top weir can extend down from the top portion of the pre-filter chamber. The bottom weir can extend up from the bottom portion of the pre-filter chamber. The top and bottom weirs of the bypass structure can also be dimensioned to align with the top and bottom portions of the pre-filter chamber, respectively.

In another embodiment, the present invention provides an underground storm water management system comprising a means for pre-filtering gross pollutants from incoming storm water in a pre-filter chamber; a means for treating storm water passing from the pre-filter chamber in a biofiltration chamber; and a means for releasing untreated flows through a bypass structure, wherein said bypass structure comprises a top weir and a bottom weir, respectively.

In yet another embodiment, the present invention provides a method for treating storm water runoff comprising the steps of removing gross pollutants from incoming storm water in a pre-filter chamber; removing fine and dissolved pollutants from incoming storm water in a separate bio filtration chamber; and releasing untreated storm water through a high flow bypass structure comprising a top weir and bottom weir.

One of the features of the present invention includes a screen along a side of the pre-filter chamber. In one embodiment, a side of the pre-filter chamber is dimensioned to fit at an inlet curb opening and the pre-filter chamber is adjacent to the biofiltration chamber along a substantially perpendicular side. In another embodiment, a side of the pre-filter chamber is dimensioned to fit at an inlet curb opening and the pre-filter chamber is adjacent to the biofiltration chamber along a substantially parallel side.

Another feature of the present invention includes a bypass structure wherein the top of the bottom weir is set at an elevation at or below the bottom of the curb inlet. In one embodiment, at least a portion of the top weir is in front a portion of the bottom weir. The bottom of the top weir is set an elevation below the top of the bottom weir.

Another feature of the present invention includes covers that provide access to the bioretention system. In one embodiment, the pre-filter chamber can comprise a hinged access cover disposed along a top side. The biofiltration chamber can further comprise a grate disposed along a top side. The pre-filter chamber can further comprise an access opening along the bottom floor, connected to the "vault" structure. The covers can provide access for inspection and maintenance purposes.

Another feature of the bioretention system is that it may be assembled in various configurations and used in conjunction with existing storm water storage systems. These include connections to a pipe, chamber, or modular water storage system to address site hydromodification and water quality on a developed site. The pre-filter and biofiltration chambers can be disposed in different configurations relative to a curb or drain inlet to accommodate different surface structures and site requirements. Treated flows may be collected, stored, or infiltrated to help meet different design criteria for the site.

In the below description, numerous specific details are provided, such as the identification of various system components, to provide an understanding of embodiments of the invention. Numerous other variations and embodiments can be discerned from the above-detailed description of the intentions and illustrations thereof. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention. All such variations are encompassed within the scope and spirit of the present invention.

BRIEF DESCRIPTION OF THE DRAWINGS

Embodiments of the present invention may be described with reference to the accompanying drawings.

FIGS. 12A through 12D illustrate schematically another configuration of the bioretention system of the present invention. In this "side configuration," the system includes two biofiltration chambers on either side of a pre-filter chamber, all placed on the same side as the curb inlet opening. FIG. 12A illustrates schematically an angled side view of the bioretention system. FIG. 12B illustrates a planar top view of the bioretention system. FIG. 12C illustrates schematically a side view of the bioretention system, along the curb inlet opening side. FIG. 12D illustrates schematically another side view of the bioretention system.

FIGS. 13A through 13C illustrate schematically side views of some of the bioretention systems of the present invention used in conjunction with various storm water storage systems to address site hydromodification and water quality. FIG. 13A illustrates schematically a bioretention system used in conjunction with an underground pipe system. FIG. 13B illustrates schematically a bioretention system used in conjunction with an underground chamber system. FIG. 13C illustrates schematically a bioretention system used in connection with an underground pipe system in a modular manner.

DETAILED DESCRIPTION OF THE INVENTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

I. Overview

The present invention provides a bioretention system for storm water management applications. A wide range of storm water management applications may be addressed using the system described herein. These include but are not limited to include controlling and treating storm water flow in parking lot islands, median strips, and traffic islands, median strips, sidewalks, and swales. The bioretention system can be installed in newly developed land or retrofitted in developed sites during resurfacing.

Figure 1:
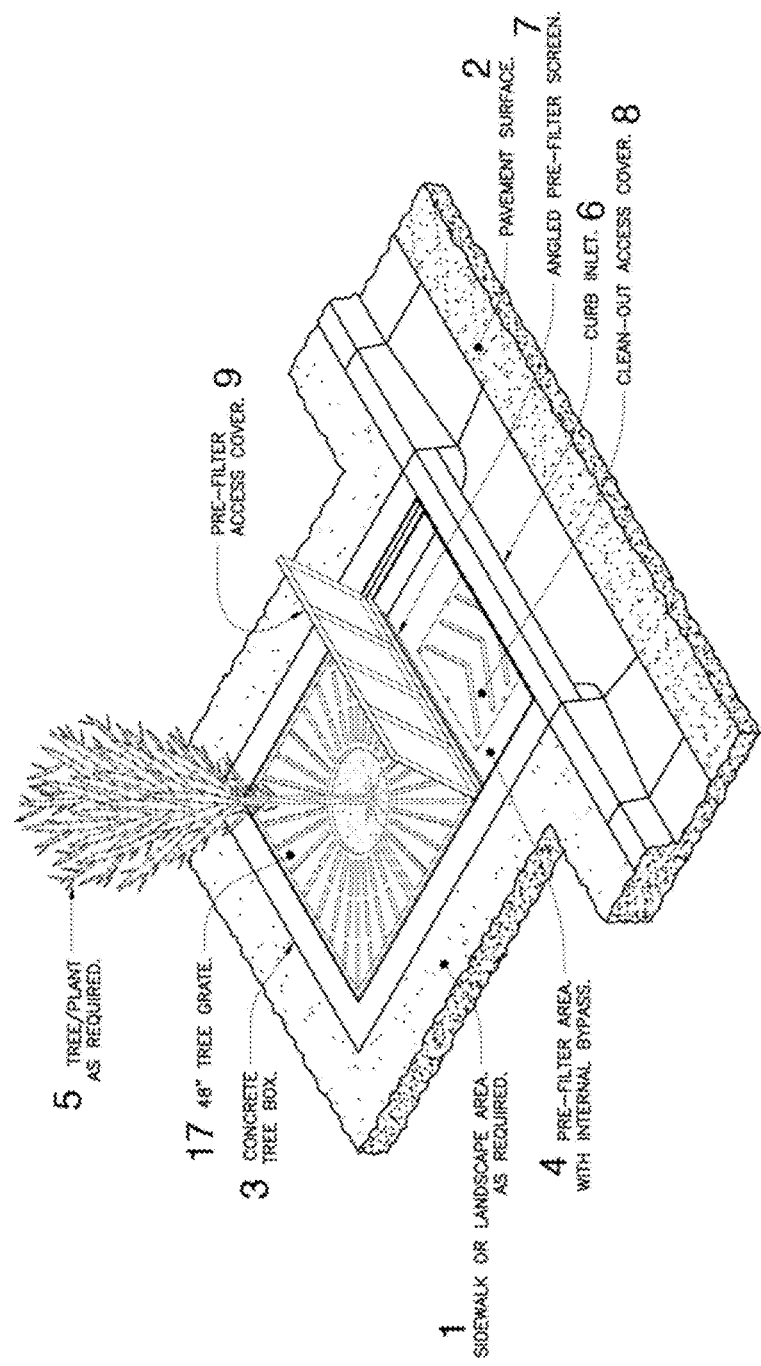
FIG. 1 illustrates schematically an angled top view of one embodiment of the bioretention system of the present invention installed in a sidewalk or landscape area. The bio filtration chamber is adjacent to the pre-filter chamber, and the bioretention system is configured relative to the curb inlet in an "end configuration."
Figure 11:
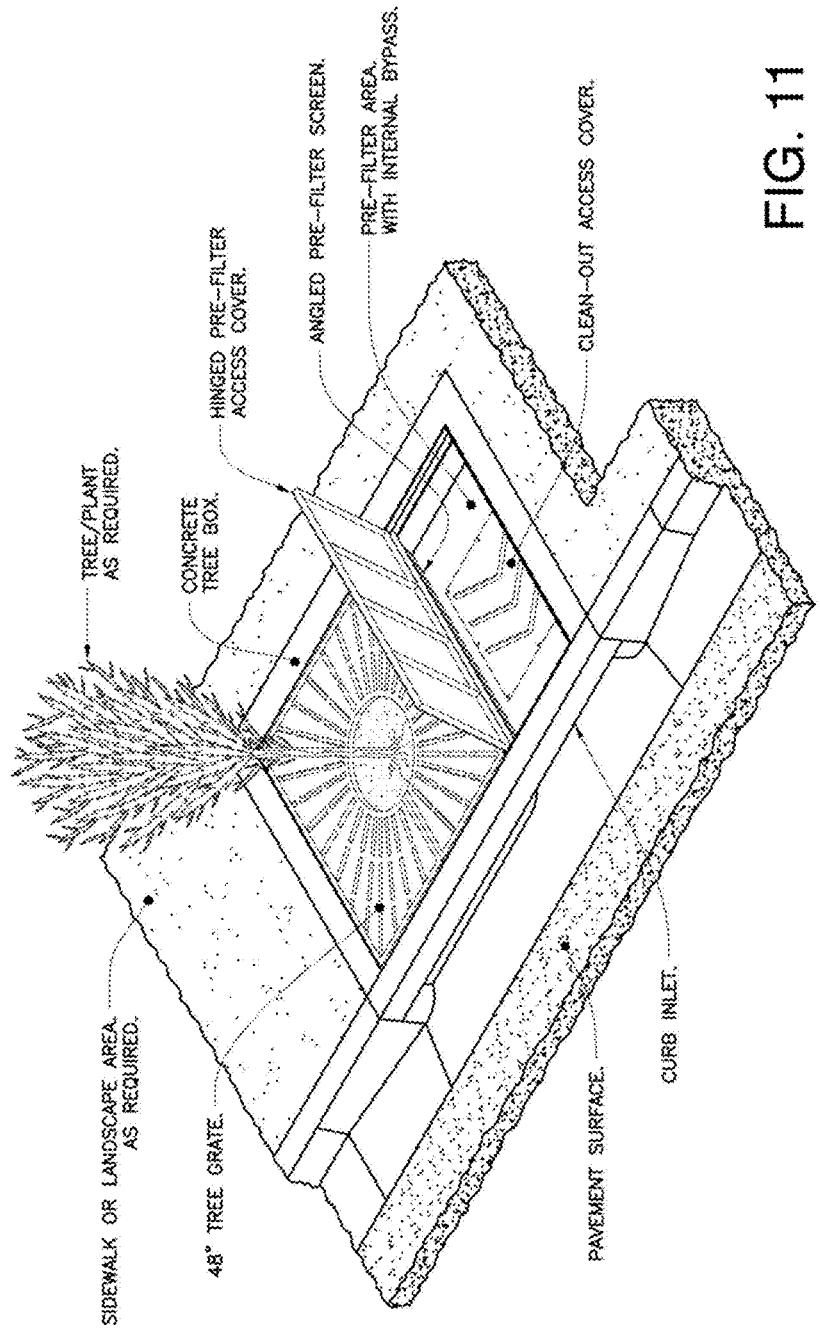
FIG. 11 illustrates schematically an angled top view of a bioretention system with a bio filtration chamber adjacent to the pre-filter chamber. The bioretention system is configured relative to the curb inlet in a "side configuration."

As illustrated in FIG. 1, in one embodiment, a bioretention system is integrated within a sidewalk or landscape area 1. The system rests at least in part underground, below the pavement surface 2, and includes a pre-cast concrete tree box also referred to as a "vault" structure 3 with four sidewalls. The "vault" structure houses a substantially rectangular inlet chamber also referred to as a pre-filter chamber 4, as well as an adjacent biofiltration chamber that is designed to contain biofiltration media and a tree 5, shrub, or other plant and vegetation. Storm water can enter the bioretention system through an inlet opening placed along a curb inlet 6 or drainage inlet or through the tree grate 17. Although the shape of the pre-filter chamber is described in this embodiment as being substantially rectangular, one of ordinary skill in the art will recognize that the pre-filter chamber of the present invention can include other shapes (e.g., non-rectangular, irregular, cylindrical, circular, or other shapes known in the art). The inlet opening can be placed at an end (as shown in FIG. 1) or a side (as shown in the embodiment of FIG. 11) of the tree box.

Figure 8:
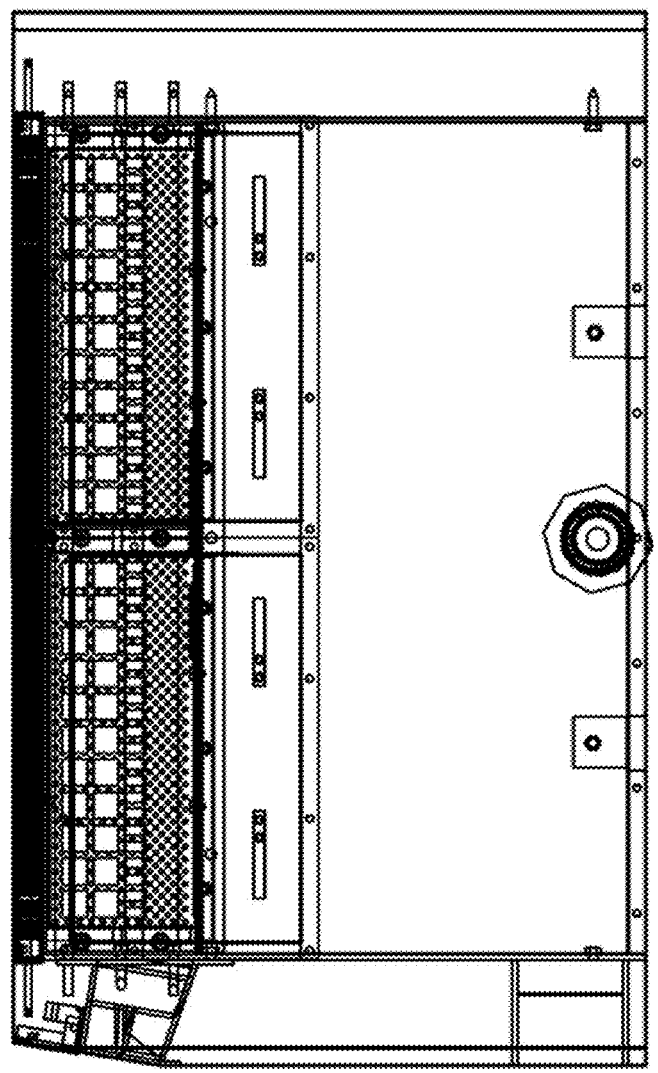
FIG. 8 illustrates schematically a side view of one embodiment of the angled filter screen of the present invention.

Storm water enters the pre-filter chamber through the inlet opening. An angled pre-filter screen 7 (shown in greater detail in FIG. 8) rests between the pre-filter chamber and the adjacent bio filtration chamber containing bio filtration media. The pre-filter screen is a permeable, lattice structure with spaces that allows storm water passage, while it obstructs the passage of gross pollutants through the screen. In this way, the pre-filter screen can separate gross pollutants, such as trash, debris, floatables, and coarse sediments, from entering storm water and allow the filtered storm water to pass through to the adjacent chamber. Because they can obstruct storm water flow through the bioretention system, such gross pollutants are known to reduce efficiency and increase maintenance frequency of a typical tree box filter. Thus, the use of the pre-filter screen to separate gross pollutants from the entering storm water can increase the overall efficiency and decrease maintenance frequency of the tree box filter.

The pre-filter area includes a moveable "floor," also referred to as a clean-out access cover 8, along a bottom of the area. The floor can be a sheet of metal or other suitable material and the shape depends on the shape of the pre-filter chamber. It can be attached to the bottom of the pre-filter chamber by one or more hinges or other connection mechanisms along a side edge of the floor. The floor can be lifted to allow access to the area underneath the pre-filter chamber.

Gross pollutants that are retained and accumulate in the pre-filter chamber can be removed from the bioretention system by lifting a pre-filter access cover 9 located along a top portion of the pre-filter chamber. The access cover comprises a removable lid of various shapes and sizes and provides an access port to the pre-filter chamber. In one embodiment, the access cover is a hinged structure covering a substantial portion of the pre-filtration chamber. In another embodiment, the access cover is a removable lid without a hinge and rests above at least some portion of the pre-filter chamber. This access cover panel facilitates access to and maintenance of the bioretention system, even when installed in a sidewalk or landscape area. Collected gross pollutants can be removed from the pre-filter chamber through the access cover panel, without disturbing the adjacent area containing bio filtration media.

The presence of the pre-filter chamber and especially pre-filter screen extends maintenance intervals and can help assure peak filter performance. The ability to separately maintain, clean, and/or repair the bioretention system with relative ease through the access cover panel provides a significant advantage in the use of such systems.

II. Normal Flow Conditions

Figure 3:
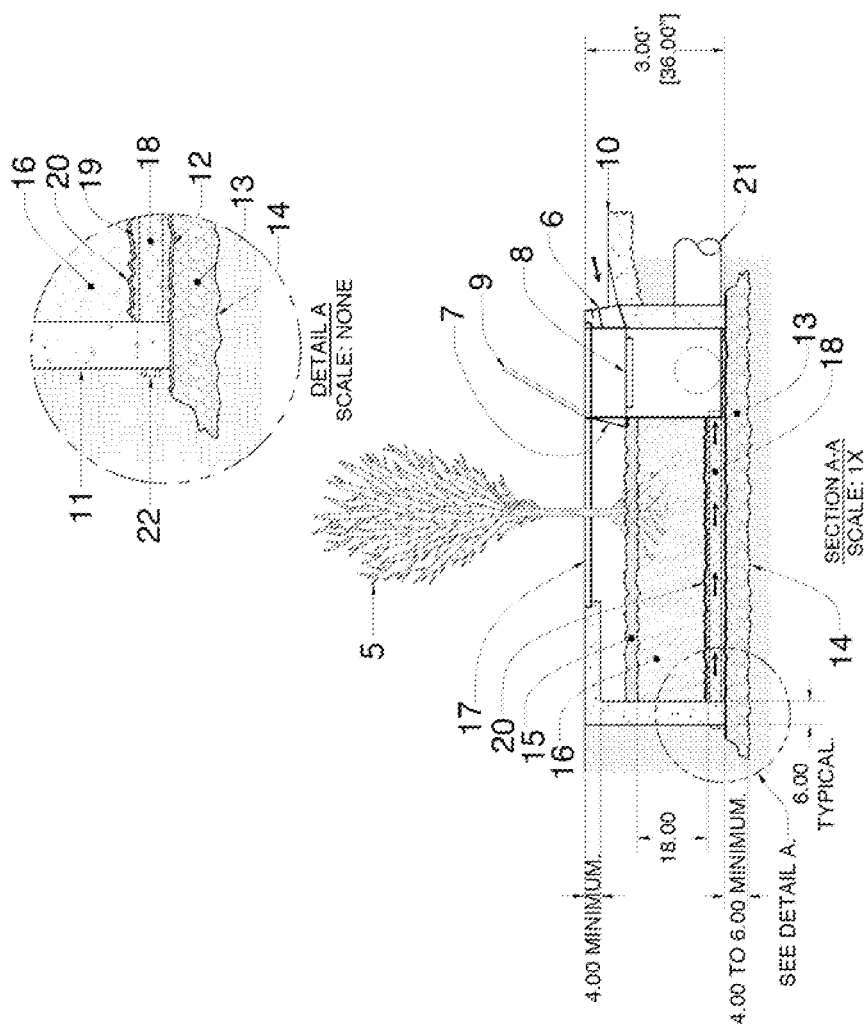
FIG. 3 illustrates schematically a cross-sectional side view of one embodiment of the bioretention system containing biofiltration media and installed in a sidewalk or landscape area. A more detailed cross-sectional view of a bottom corner of the bio filtration chamber is shown in exploded view.

Under normal flow conditions, storm water entering the pre-filter chamber from the curb inlet (or other source opening) can be directed downward and sideways through the pre-filter screen and into a bio filtration chamber. FIG. 3 illustrates schematically a cross-sectional side view of one embodiment of the bioretention system containing a tree planted in mulch and biofiltration media, as installed in a sidewalk or landscape area. As shown, the bioretention system is housed within a substantially rectangular tree box or "vault" structure. Although the shape of the vault is described in this embodiment as being substantially rectangular, one of ordinary skill in the art will recognize that the bioretention system of the present invention can include other shapes (e.g., non-rectangular, irregular, cylindrical, circular, or other shapes known in the art). The pre-filter chamber includes an angled pre-filter screen and is adapted to receive storm water from a curb inlet. The floor of the pre-filter chamber 8 is located below the gutter flow line 10. A biofiltration chamber is at least partially enclosed by sidewalls of the concrete tree box 11 and forms a chamber for the biofiltration media 16.

Figure 9:
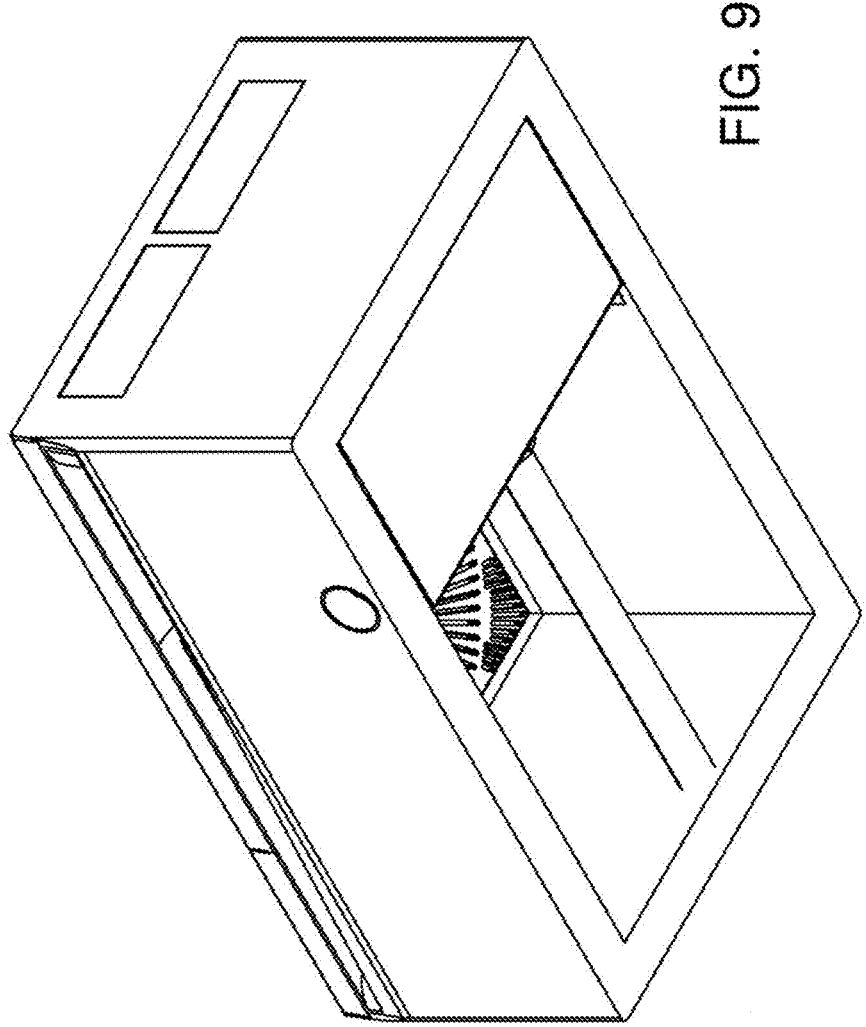
FIG. 9 illustrates schematically an angled bottom view of one embodiment of the bioretention system of the present invention.

In a preferred embodiment, the bio filtration chamber is directly adjacent to the pre-filter chamber. Three sidewalls of the tree box form three of the sidewalls of the biofiltration chamber. A side of the pre-filter chamber and a divider below the pre-filter area (shown in FIG. 5, discussed below) form the fourth sidewall of the bio filtration chamber. Together, the four sidewalls form a chamber or an enclosure for the bio filtration media 16. The bottom of the bio filtration chamber can be substantially open, as shown in FIG. 9. The open bottom of the bio filtration chamber can be optionally lined with a permeable or impermeable liner 12, if needed. The bioretention system rests on a bedding material layer 13 that is placed above the excavation line 14.

The bio filtration chamber can contain planting mulch 15 and bio filtration media 16, as well as several layers of materials for storm water infiltration. The materials can include one of many known compositions that have been proven effective in the removal of ultra-fine and dissolved pollutants from storm water (e.g., engineered planting soils). The biofiltration media can be designed, for example, to capture very fine sediments, nutrients, metals, oils, grease, organics and bacteria. In one embodiment, a layer of plant materials, ground cover, and/or planting mulch 15 is placed above biofiltration media 16, and a tree 5 or other plant is placed in the biofiltration chamber. The composition of the bio filtration chamber can be customized to target specific pollutants and/or meet site-specific pollutant removal criteria. The ordinary artisan will recognize that a wide range of filter media, including known engineered soils, are available and can be used in the biofiltration chamber of the present invention.

Figure 2:
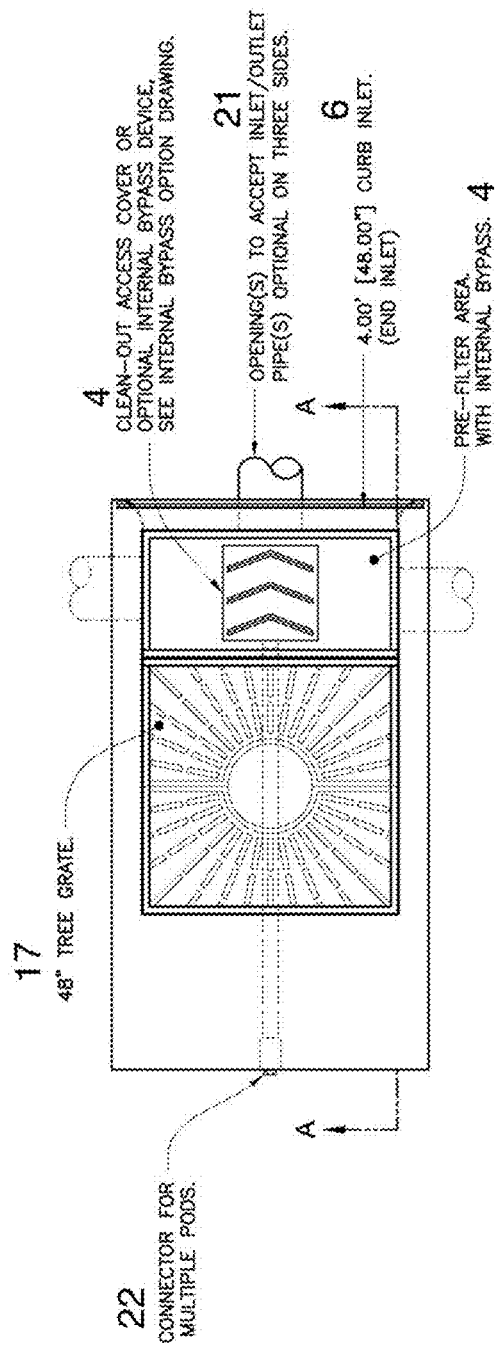
FIG. 2 illustrates schematically a planar top view of one embodiment of the bioretention system of the present invention with openings for outlet pipes on three sides of the tree box. A perforated pipe extends from the bottom of the biofiltration chamber to transport fluid to an outlet of the bioretention system.

As shown in FIGS. 1 and 2, a tree grate 17 rests above the biofiltration chamber. The tree grate has openings to allow storm water to flow into the biofiltration chamber. As shown in FIG. 3, a perforated pipe 18 is disposed horizontally along a bottom of the bio filtration chamber. The perforated pipe or other fluid conveying apparatus can be cylindrical in shape. The pipe 18 or fluid conveying apparatus includes openings along its length that are designed to permit water flowing through the mulch 15 and filter media 16 to leak into the pipe. In some embodiments, the perforated pipe 18 is surrounded by a layer of drain rock 19 and placed between a geotextile liner 20 and/or permeable or impermeable liner 12 as required.

In some embodiments, the assembly is surrounded at least in part by an impermeable liner (e.g., PVC, HDPE) to function as a storage or detention system. In other embodiments, an impermeable liner may also be wrapped around perforated pipe to provide additional protection against unfiltered water leakage into the rest of the assembly resulting in contamination. In yet other embodiments, the assembly is surrounded by a woven or non-woven geotextile liner to function as a water infiltration or retention system. The bedding material layer placed above the excavation line provides, among its functions, overall structure support for the bioretention system.

During routine flow, the storm water, which is also referred to herein as "first flush flow" or "low flow," passes from the pre-filter chamber through the angled pre-filter screen 7 to a bio filtration chamber containing planting mulch 15 and filter media 16. The storm water then percolates through the filter media until it reaches the bottom of the biofiltration chamber. The treated storm water is captured in one or more perforated pipes 18 located near the bottom of the biofiltration chamber. The treated storm water flows through the pipe 18 and can then be released through one or more outlet openings 21 to an underground pipe or other storm water retention or detention system.

Appropriate outlet openings may be fit to the top, bottom, or side face openings in the "vault" structure or tree box. The ordinary artisan will recognize that the absolute dimensions of the openings can be selected to accept industry standard pipe connections/fittings (e.g., rubber boots). Such fittings can offer flexible and water tight connections between the bioretention system and piping for controlling water flow into and out of the system. Connectors placed along a side of the tree box 22 can be used to join multiple bioretention systems. The modular nature of the system can increase processing of storm water for a particular land site, as required by the user.

In one embodiment, the first flush flow travels horizontally through a perforated pipe 18 along a bottom of the bio filtration chamber through one or more side face outlet openings in the "vault" structure (underneath the pre-filter area), and into an underground water retention and/or detention system. The ordinary artisan will recognize that the outlet opening can be fitted with (or easily adapted for fitting with) any fitting, pipe, or valve system, well-known in the art of water management systems.

II. High Flow Bypass Formed Using an Up and Over Weir

A high flow bypass structure can be integrated within the bioretention system to accommodate periods of high flow. During periods of peak flow (for example, heavy rain events, extreme storm conditions or other flood type conditions), at least a portion of the storm water entering the system is not treated in the bio filtration chamber and is instead allowed to accumulate to a pre-filter depth in the pre-filter chamber. Once the storm water rises to the pre-filter depth, the storm water then flows over a weir or a baffle and through an opening in the bypass structure. The storm water bypasses the bio filtration chamber (is not treated by the bio filtration media) and is released through one or more openings along a side of the bioretention system. Once it is released from the bioretention system, the bypass flows can enter a pipe or other storm water retention or detention system.

Figure 4:
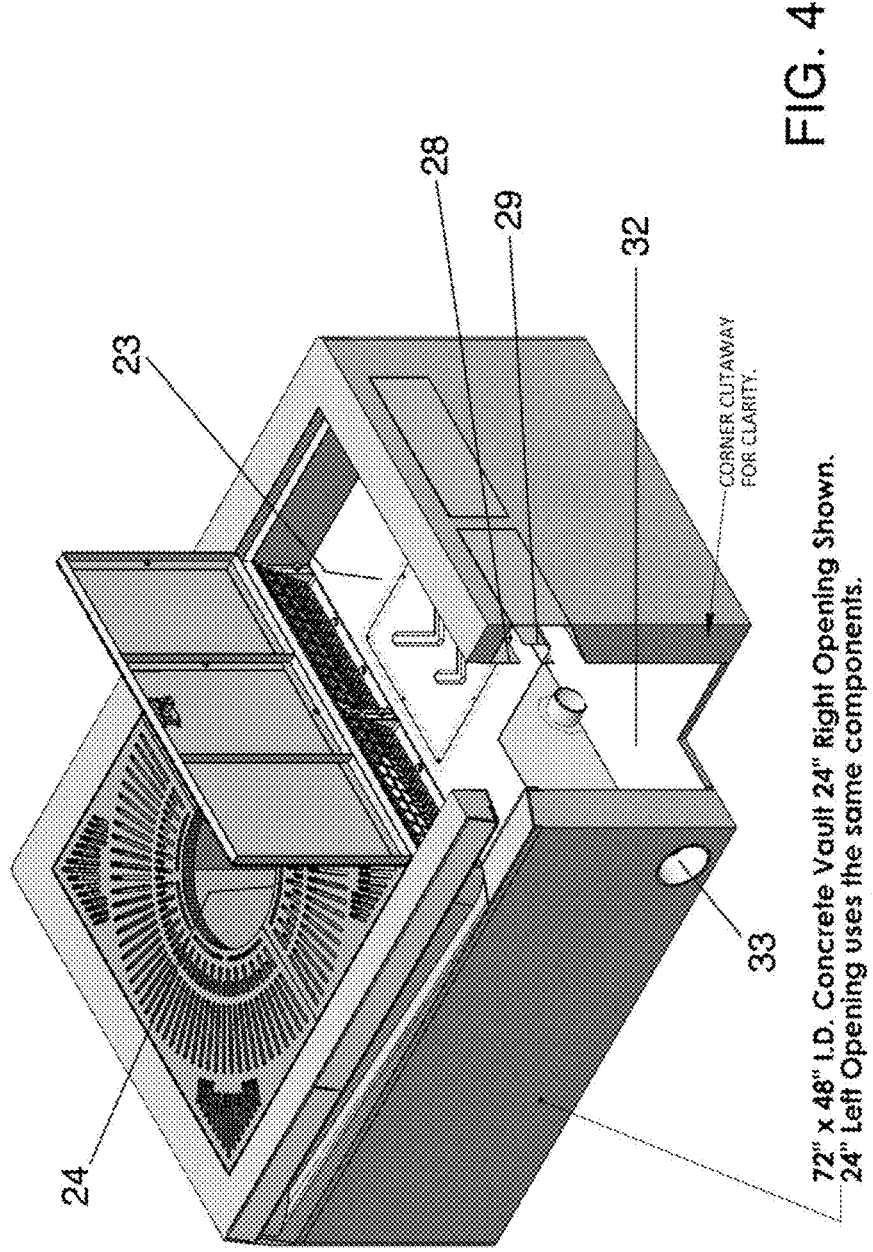
FIG. 4 illustrates schematically an angled side view of one embodiment of the bioretention system in a "side configuration." The corner cutaway illustrates schematically a preferred embodiment of the pre-filter chamber with a high flow bypass structure.
Figure 5:
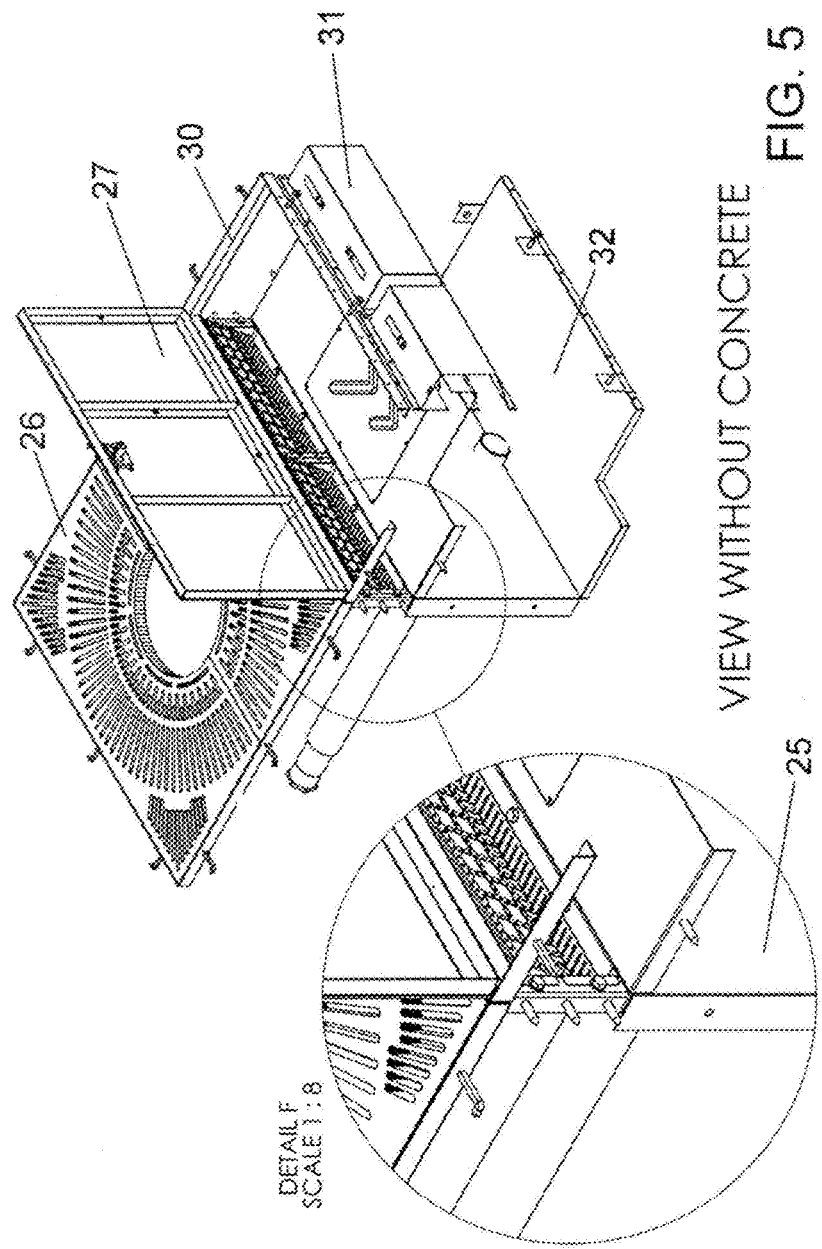
FIG. 5 illustrates schematically an angled side view of some of the internal components of one embodiment of the bioretention system without concrete. A pre-filter chamber is adjacent to a bio filtration chamber. In addition, a side profile of the bioretention system is shown in exploded side view.

FIGS. 4 and 5 illustrate schematically one embodiment of a bioretention system with an internal high flow bypass of the present invention. A "vault-like" tree box includes a pre-filter chamber 23, as well as a biofiltration chamber 24. A divider wall 25 separates the bio filtration chamber from the remaining parts of the system. An internal high flow bypass structure is located along the side of the pre-filter chamber. A tree grate 26 rests above the biofiltration chamber. A cover 27 allows access to the pre-filter chamber. In one embodiment, the bypass structure can be cast right into the sidewall of the tree box structure so the capacity of the neighboring bio filtration chamber 24 is not significantly affected by the incorporation of the internal bypass structure. This integration of the bypass structure into the sidewall of the system maximizes the space and capacity of the system to process storm water flow, reduces the overall "footprint" of the system, and reduces overall fabrication and material costs. In addition, the incorporation of a bypass within the pre-filter chamber can minimize the disturbances in the bio filtration chamber.

The bypass structure includes a set of baffles or weirs, including a vertical baffle or top weir 28 and another vertical baffle or bottom weir 29. At least a portion of the top weir is placed in front of the bottom weir. The top weir extends downward from a top portion of the pre-filter chamber and closes off a portion of the wall of the pre-filter chamber to obstruct fluid flow. In one embodiment, an upper portion of the top weir can be aligned with the edge of a top frame 30 that rests along the rim of the tree box structure.

The bottom weir is a partial wall placed behind the top weir. It extends upward from a bottom portion of the pre-filter chamber and terminates before it reaches the top of the pre-filter chamber. In this way, the bottom weir forms a partial wall that is impermeable to water. The bottom weir redirects water toward the bio filtration chamber during normal flow periods, while allowing bypass flow when the water rises above the height of the bottom weir. The bottom weir can be integrally part of the pre-filter chamber and constructed from the same piece of material as the inlet chamber, such that the unit is manufactured as one piece. Alternatively, the bottom weir can be a separate structure, otherwise adapted to align with the openings of the pre-filter chamber through mechanisms known by ordinary artisans.

During peak periods of fluid flow, storm water accumulates in the pre-filter chamber as it reaches the height of the bottom weir, i.e., the pre-filter depth. After the storm water exceeds the pre-filter depth, storm water will flow over the bottom weir and through the bypass opening. The pollutants are accumulated at the bottom of the pre-filter chamber and the bottom weir can act as a filtration mechanism by obstructing the flow of pollutants into the bottom portion of the tree box. The bypass flow is then directed through a flume 31 to the lower portion of the tree box 32 where it can be released from the system without entering the treatment area. In one embodiment, the bypass flow is directed to a bottom portion of the tree box 32 underneath the pre-filter chamber and then exits through an outlet opening 33 located in the bottom of the tree box. In a preferred embodiment, to prevent backups, the height of the bottom weir is set at or below the flow line of the inlet (i.e., at or below the gutter elevation) so that the storm water can be directed to the bypass before it flows back onto the street.

In a preferred embodiment, the high flow bypass structure is cast in the side of the wall of the high flow bioretention system. The height of the bottom of the bottom weir is designed to correspond to the height of the "floor" of the pre-filter chamber. Further, the height of the bottom of the top weir is set below the height of the top of the bottom weir.

During periods of normal flow, the top weir can first direct incoming water from the curb inlet to the bottom of the pre-filter chamber before it exits through the high flow bypass opening. In this way, the amount of untreated flow (as well as suspended pollutants) that can escape via the bottom weir is reduced.

Figure 6:
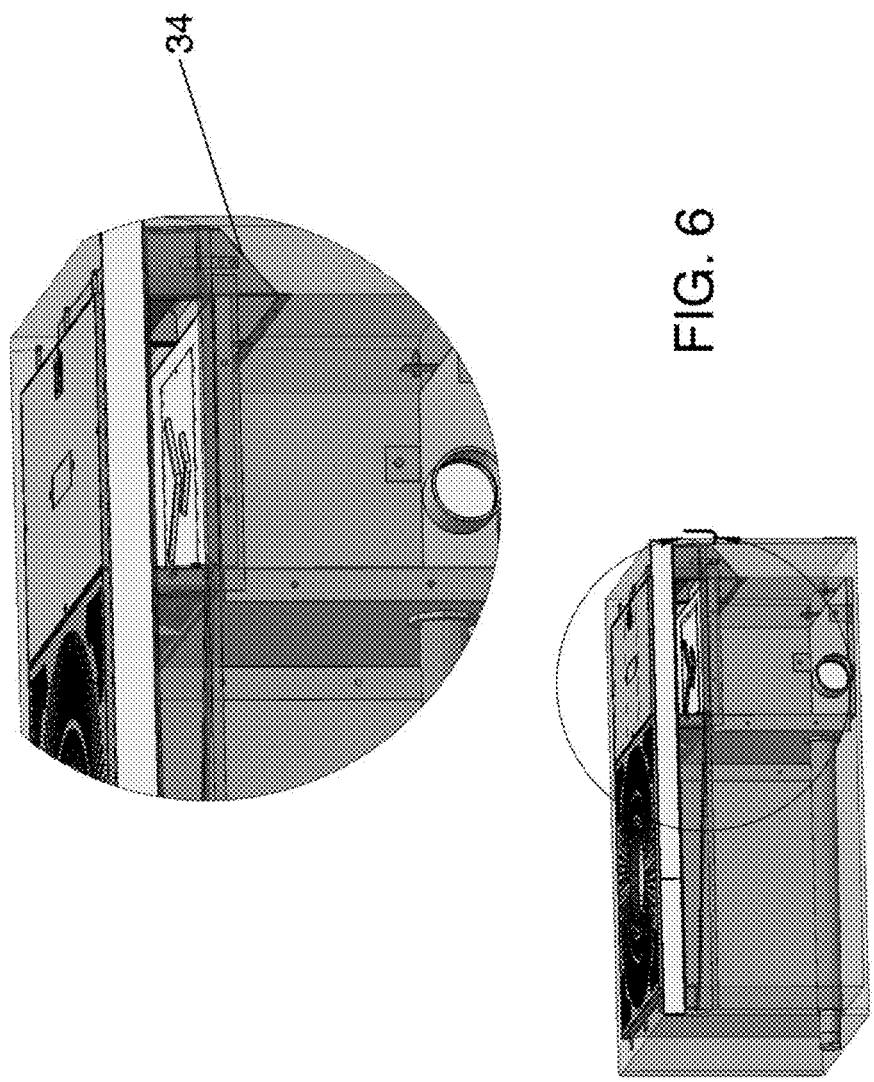
FIG. 6 illustrates schematically a cross sectional side view of a concrete vault with a high flow bypass flume located along a side of pre-filter chamber.
Figure 7:
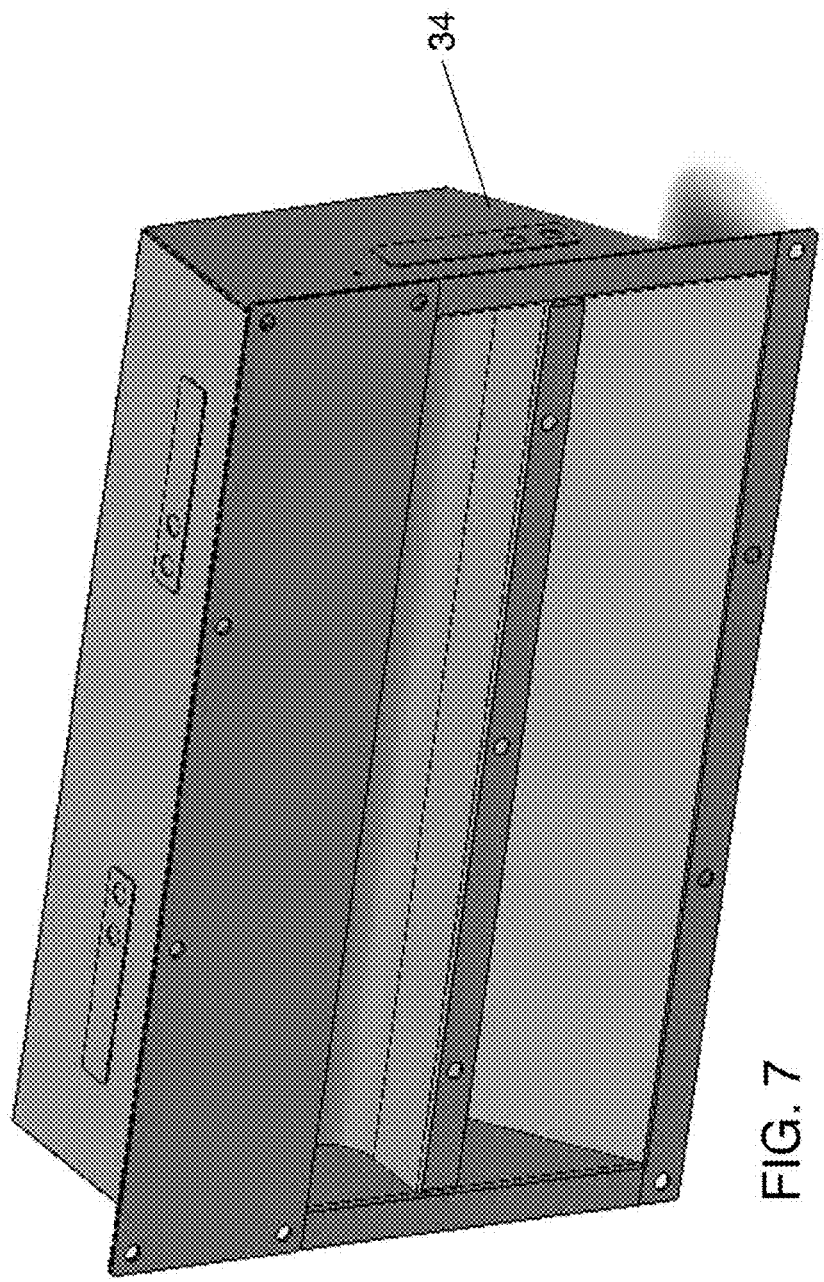
FIG. 7 illustrates schematically an angled side view of some of the components of the high flow bypass structure of FIG. 6 in more detail.

FIGS. 6 and 7 illustrate schematically in more detail one embodiment of the high flow bypass structure of the present invention. As shown in FIG. 7, the high flow bypass structure can include openings along a front side for fluid flow. At least one of the surfaces along a back side is angled such that the lower portion of the bypass structure forms a flume 34 or a channel to direct storm water flow downward during high flow conditions.

The high flow bypass structure also includes a top weir extending from a top portion of the bypass structure. The top weir extends downward from the top of the structure and terminates before it reaches the bottom of the structure. The top weir is designed to obstruct a part of the opening along the front side of the high flow bypass structure (during normal flow situations), while allowing some storm water to flow through the opening during high flow situations.

An bottom weir is located near the bottom of the high flow bypass assembly. The bottom weir is formed from a substantially "L-shaped" or arched structure with a substantially horizontal portion at the bottom and a substantially vertical portion. In one embodiment, the height of bottom of the bottom weir is designed to correspond to the height of the "floor" of the inlet chamber. The height of the bottom weirs, however, can be designed to accommodate different flow rates and different bypass flows. In one embodiment, when higher bypass flow is desired (for example, during periods of peak flow), the height of the bottom weir is lowered. The ability to efficiently regulate the amount of bypass flow through adjusting the height of the weirs provides a significant advantage in the use of such systems.

During periods of high flow, the storm water is allowed to accumulate to the height of the top of the bottom weir. When the height of the storm water exceeds the height of the top of the bottom weir, the storm water will flow over the bottom weir, down toward the flume, and through a bypass opening into the bottom of the bioretention system 32. The angled lower portion of the flume leads bypass flow from the bottom weir to the bottom of the bioretention system 32. The bypass flow will exit through an opening at the bottom of the bioretention system 33. It can then enter external piping or another water detention/or retention system.

Figure 10B:
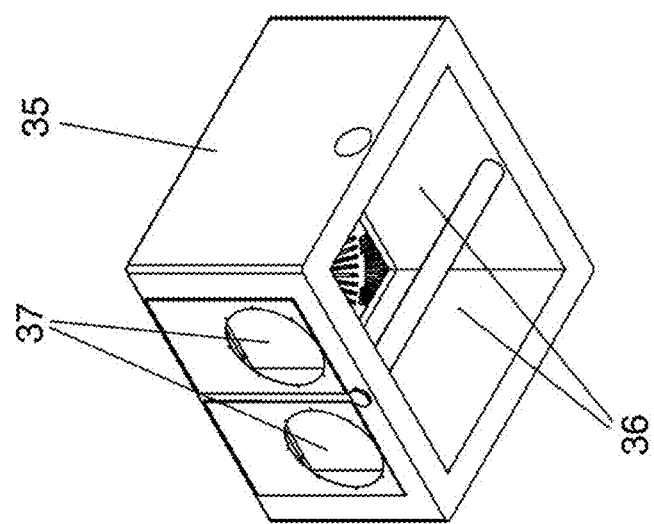
FIGS. 10A and 10B illustrate schematically angled side views of another embodiment of the bioretention system with no pre-filter chamber. The high flow bypass structure is located along a sidewall of the biofiltration chamber.
Figure 10A:
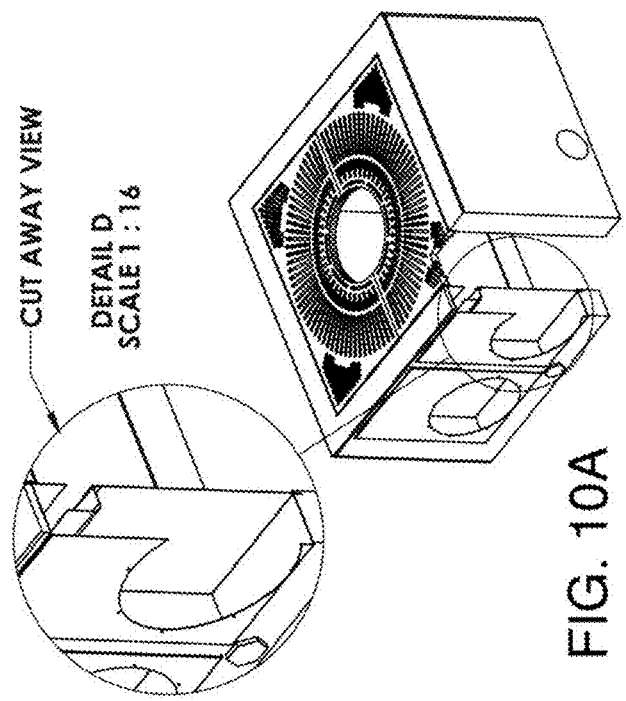

In another embodiment, multiple high flow bypass structures can be incorporated in the bioretention system to further increase the capacity to process high fluid flow. For example, two bypass structures can be placed side by side along a sidewall of the pre-filter chamber (as shown in FIGS. 10A and 10B, described below). The bypass structures can also be cast onto different sides of the inlet chamber. In some instances, in addition having an internal bypass structure as described above, it might be desirable for the bioretention system to be used in connection with another separate external bypass structure.

In yet another embodiment, the high flow bypass structure can be incorporated into a bioretention system without a pre-filter chamber. As shown in FIGS. 10A and 10B, a pre-cast concrete vault 35 includes four sidewalls with an open bottom 36. Two internal high flow bypass structures, each including a top weir and a bottom weir, are incorporated into a sidewall of the vault. Outlet openings 37 allow bypass flow to exit the bioretention system. During peak periods of fluid flow, water entering the bioretention system through the tree grate 39 has an alternate flow route. Bypass flows are transported past the bottom weirs, through the bypass chamber, and then exit through outlet openings 37, as an alternative to release through the pipe at the bottom of the bioretention system.

While the further addition of a separate external high flow bypass may be desirable in some instances, the use of the internal high flow bypass structure of the present invention significantly increases the flow capacity of the overall system. Thus, there may be no need for a separate external bypass system to process excess storm water flow for a particular site. Moreover, there can be optional multiplication and variable placement of bypass manifolds in the present invention. The ability to incorporate an internal high flow bypass within the bioretention system can significantly reduce space demands, fabrication and material costs, and simplify maintenance procedures. The presence of the high flow bypass feature increases the capacity of the system to process storm water flow. In addition, the integration of the high flow bypass into the "vault" structure reduces space demands and facilitates construction of the system. The ability to install, fabricate, and maintain the bioretention system with relative ease provides a great advantage in the use of such systems.

III. Adaptability to Different Flow Rates and Construction Sites

A. Sizes

The bioretention system can be designed in different sizes to accommodate different flow rates and types of fluid flow. The ordinary artisan will recognize that there is a correlation between the size of the inlet and flow rate. The deeper and wider a particular inlet, the more flow it can accept, and the more bypass capability is required. In some embodiments, it is contemplated that the dimensions of the vault or tree box structure (and the shell of the high flow bypass) can vary within a range dependent on one or more design factors including but not limited to: desired water volume capacity, desired weight of each modular vault structure, desired load-bearing tolerance for each unit, desired amount of water flow to be managed, size and structure of overall assembly in which the vault structure is used, and/or the desired access space for inspection and maintenance purposes.

An advantage of the bioretention system of the present invention is that its design is scalable. Moreover, the system can be manufactured in standard sizes and shapes to meet different site requirements. The following illustrates possible flow capacities for exemplary vaults designed according to the present invention.

| Pod Size | Unit Outside Dimensions | Rated Flow Capacity (GPM/CFS) | Impervious Area Treated (ACRE) |
|---|---|---|---|
| 4' × 4' | 5' × 7' | 16/0.036 | 0.22 |
| 4' × 6' | 5' × 9' | 24/0.054 | 0.33 |
| 4' × 8' | 5' × 11' | 32/0.071 | 0.44 |
| 6' × 6' | 7' × 9' | 36/0.080 | 0.50 |
| 6' × 10' | 7' × 13' | 60/0.134 | 0.83 |
| 6' × 12' | 7' × 15' | 72/0.160 | 1.00 |

The sizes and flow rates listed above are provided for illustrative purposes and are not intended to limit the scope of the invention. The ordinary artisan will recognize that the shape of the tree box and absolute dimensions can be varied based on the range of design options available, e.g., materials, water management application, excavation site, etc. For example, smaller dimensions may be selected for residential water management applications where less underground water retention/detention volume is needed or available. Alternatively, larger dimensions may be desired for larger industrial application, particularly where solid body construction modular units are used (e.g., pre-cast concrete embodiments).

B. Configurations

The bioretention system of the present invention can also be configured in different arrangements for different flow and treatment capacities. As shown in FIGS. 1 and 2, in an "end configuration" the biofiltration chamber can be placed adjacent to the pre-filter chamber but away from the curb inlet opening. This configuration can be adapted for use, for example, in narrow, trench-like areas.

Alternatively, in a side configuration, as shown in FIG. 11, the bio filtration chamber is located along the same side as the curb inlet opening and adjacent to the pre-filter chamber. In this configuration, the bio filtration chamber is located in a relatively closer distance from the curb, as compared with the end configuration. In either side or end configuration, the bio filtration chamber can include one or more tree grates and one or more trees. A side configuration with two biofiltration chambers, with a pre-filter chamber interposed in between the two biofiltration chambers, is shown in FIG. 12.

Further, as shown in FIG. 4 (discussed above), in some embodiments, a connector pipe or other connecting means are integrated into the structure to laterally couple the bioretention system to other filtration modules or structures. In this way, multiple bio filtration chambers can be placed in series to process additional storm water flow. The connecting means may comprise a separate connector piece (e.g., fasteners, pins, rods, or clips) introduced during assembly of the bioretention system.

C. Materials Used for Construction

The ordinary artisan can recognize that materials commonly used in applications involving underground retention/detention of water can be employed with in the present invention. Generally, any material that can be molded or cast can be used to fabricate the vault or tree box structure.

For example, the bioretention system can be constructed of durable precast concrete. One-piece construction ensures ease of installation and long service life. To further enhance ease of handling and installation, the bioretention system can also be constructed, in whole or part, of metal (e.g., aluminum or stainless steel), and/or fiberglass. Other materials useful for construction of the bioretention system components and assemblies constructed therefrom include but are not limited to: polypropylene, high density polyethylene, low-density polyethylene, or rubber.

D. Hydromodification

The bioretention system may be used in conjunction with numerous different storm water systems to address hydromodification, hydraulic features, and water quality in a given land site. For example, as shown in FIG. 13A, the bioretention system may be used with an existing underground pipe system. As shown in FIG. 13B, the bioretention system may also be used with an underground chamber system. As shown in FIG. 13C, the bioretention system may also be used in a modular manner with an underground pipe system. Thus, collected flows may be utilized to supplement irrigation of surrounding vegetated areas through active or passive means, reducing demands on local water supplies.

The above disclosures are sufficient to enable one of ordinary skill in the art to practice the invention, and provide the best mode of practicing the invention presently contemplated by the inventor. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. A bioretention assembly for use in an underground storm water management system, comprising:
   (a) four sidewalls;
   (b) a first chamber disposed within said sidewalls and comprising an inlet opening, a bottom surface, a filter screen along a first side, and a bypass opening along a second side;
   (c) a second chamber adjacent to the first chamber and comprising one or more side openings adapted to receive fluid passing through the filter screen of the first chamber;
   (d) a third chamber disposed below the first chamber and comprising a side opening adapted to receive fluid passing through the bypass opening of the first chamber and an outlet opening; and
   (e) a bypass structure disposed in fluid communication with said bypass opening and comprising a top weir and a bottom weir;
   wherein the bypass structure is adapted to direct fluid through the filter screen of the first chamber and through the side opening of the second chamber when the fluid accumulates below the height of the bottom weir; and
   further wherein the bypass structure is adapted to direct fluid through the bypass opening of the first chamber, away from the second chamber, and through the side opening of the third chamber when fluid accumulates above the height of the bottom weir.

2. The bioretention assembly of claim 1, wherein the second chamber comprises at least one of the following: biofiltration media, mulch, and plant.

3. The bioretention assembly of claim 1, wherein a portion of the top weir is in front of a portion of the bottom weir.

4. The bioretention assembly of claim 1, wherein the bottom of the top weir is set at an elevation below the top of the bottom weir.

5. The bioretention assembly of claim 1, wherein the top of the bottom weir is set at an elevation at or below the bottom of a curb inlet opening.

6. The bioretention assembly of claim 1, wherein the assembly comprises one or more bypass structures dimensioned to fit through one or more sidewalls.

7. The bioretention assembly of claim 1, wherein the second chamber further comprises one or more fluid conveying apparatus.

8. The bioretention assembly of claim 7, wherein the fluid conveying apparatus of the second chamber is coupled to a storm water storage system.

9. The bioretention assembly of claim 1, wherein the inlet opening of the first chamber comprises a curb inlet opening.

10. The bioretention assembly of claim 9, wherein the first chamber comprises a top portion, and the top weir of the bypass structure extends down from the top portion of the first chamber.

11. The bioretention assembly of claim 9, wherein the first chamber comprises a bottom portion, and the bottom weir of the bypass structure extends up from the bottom portion of the first chamber.

12. The bioretention assembly of claim 9, wherein the first chamber comprises a top portion and a bottom portion, and the top and bottom weirs of the bypass structure are dimensioned to align with the top and bottom portions of the first chamber, respectively.

13. The bioretention assembly of claim 9, wherein the first chamber further comprises an access cover along a top side and an access cover along the bottom surface.

14. The bioretention assembly of claim 9, wherein the inlet opening is disposed along a third side of the first chamber, and the second chamber is adjacent to the first chamber along a substantially perpendicular side.

15. The bioretention assembly of claim 9, wherein the inlet opening is disposed along a third side of the first chamber, and the second chamber is adjacent to the first chamber along a substantially parallel side.

16. A bioretention assembly for use in an underground storm water management system, comprising:
   (a) a first chamber comprising: an inlet opening, at least one sidewall, a bottom surface, an interior filter screen along a first side, and a bypass opening along a second side of the first chamber;
   (b) a second chamber adjacent to the first chamber, comprising: a side opening, wherein the second chamber is in fluid communication with the first chamber through the side opening and said filter screen;
   (c) a third chamber disposed below the first chamber, comprising: at least one sidewall, an opening in fluid communication with the bypass opening of the first chamber, and an outlet opening; and
   (d) a weir module integrated within said sidewalls of the first and third chambers and comprising a top weir and a bottom weir;
   wherein the first and second chambers of the assembly comprise a primary flow route; and
   further wherein the first and third chambers of the assembly comprise a secondary flow route.

17. The bioretention assembly of claim 16, wherein the second chamber comprises at least one of the following: biofiltration media, mulch and plant.

18. The bioretention assembly of claim 17, wherein the first chamber comprises a top portion, and the top weir of the weir module extends down from the top portion of the first chamber.

19. The bioretention assembly of claim 17, wherein the first chamber comprises a bottom portion, and the bottom weir of the weir module extends up from the bottom portion of the first chamber.

20. The bioretention assembly of claim 17, wherein the first chamber comprises a top portion and a bottom portion, and the top and bottom weirs of the weir module are dimensioned to align with the top and bottom portions of the first chamber, respectively.

21. The bioretention assembly of claim 17, wherein a portion of the top weir is in front of a portion of the bottom weir.

22. The bioretention assembly of claim 17, wherein the bottom of the top weir is set an elevation below the top of the bottom weir.

23. The bioretention assembly of claim 17, wherein the top of the bottom weir is set at an elevation at or below the bottom of a curb inlet opening.

24. The bioretention assembly of claim 17, wherein the first chamber further comprises an access cover along a top side and an access cover along the bottom surface.

25. The bioretention assembly of claim 17, wherein the inlet opening is disposed along a third side of the first chamber, and the second chamber is adjacent to the first chamber along a substantially perpendicular side.

26. The bioretention assembly of claim 17, wherein the inlet opening is disposed along a third side of the first chamber, and the second chamber is adjacent to the first chamber along a substantially parallel side.

27. The bioretention assembly of claim 17, further wherein the second chamber comprises one or more fluid conveying apparatus.

28. The bioretention assembly of claim 27, wherein the fluid conveying apparatus of the second chamber is coupled to a storm water storage system.

29. A method for treating storm water runoff, comprising the steps of:
   (a) flowing water into a pre-filter chamber comprising: an inlet opening, at least one sidewall, a bottom surface, a filter screen extending substantially upward from the bottom surface, and a bypass opening along a side of the pre-filter chamber;
   (b) removing gross pollutants from said water in the pre-filter chamber;
   (c) flowing water through said filter screen to an upper portion of an adjacent bioretention chamber;
   (d) filtering said water from the pre-filter chamber in the bioretention chamber;
   (e) releasing unfiltered water to an outlet chamber disposed below the pre-filter chamber through one or more bypass structures comprising a bypass opening, a top weir, and a bottom weir,
      wherein the bypass structure is adapted to direct fluid through the filter screen of the pre-filter chamber and to the bioretention chamber when fluid accumulates below the height of the bottom weir, and
      further wherein the bypass structure is adapted to direct at least a portion of fluid through the bypass opening, away from the bioretention chamber, and to the outlet chamber when fluid accumulates above the height of the bottom weir; and
   (f) releasing said unfiltered water through one or more outlets in the outlet chamber.

30. The method of claim 29, wherein at least a portion of the bypass structure is dimensioned to fit within the pre-filter chamber.

31. The method of claim 29, wherein a portion of the top weir is in front of a portion of the bottom weir.

32. The method of claim 29, wherein the bottom of the top weir is set an elevation below the top of the bottom weir.

33. The method of claim 29, wherein the top of the bottom weir is set at an elevation at or below the bottom of a curb inlet opening.

34. The method of claim 29, wherein the bioretention chamber further comprises one or more fluid conveying apparatus.

35. The method of claim 29, wherein the step of releasing said unfiltered water comprising releasing unfiltered water to a storm water storage system.

36. The method of claim 29, wherein the inlet opening is disposed along a second side of the pre-filter chamber, and the pre-filter chamber is adjacent to the biofiltration chamber along a substantially perpendicular side.

37. The method of claim 29, wherein the inlet opening is disposed along a second side of the pre-filter chamber, and the pre-filter chamber is adjacent to the bioretention chamber along a substantially parallel side.

* * * * *